(12) United States Patent  
Marmon

(10) Patent No.: US 11,782,254 B2
(45) Date of Patent: Oct. 10, 2023

(54) DIGITAL MICROSCOPY SYSTEM AND GRAPHICAL USER INTERFACE

(71) Applicant: United Scope LLC, Irvine, CA (US)

(72) Inventor: Lawrence Marmon, Irvine, CA (US)

(73) Assignee: United Scope LLC, Irvine, CA (US)

(*) Notice: Subject to any disclaimer, the term of this patent is extended or adjusted under 35 U.S.C. 154(b) by 25 days.

(21) Appl. No.: 17/384,173

(22) Filed: Jul. 23, 2021

(65) Prior Publication Data

US 2022/0026698 A1    Jan. 27, 2022

Related U.S. Application Data

(60) Provisional application No. 63/056,283, filed on Jul. 24, 2020.

(51) Int. Cl.
| | | |
|---|---|---|
| *G02B 21/00* | (2006.01) | |
| *G02B 21/36* | (2006.01) | |
| *G06F 3/04845* | (2022.01) | |
| *H04N 23/62* | (2023.01) | |
| *G02B 27/01* | (2006.01) | |

(52) U.S. Cl.
CPC ....... *G02B 21/365* (2013.01); *G02B 21/0032* (2013.01); *G06F 3/04845* (2013.01); *H04N 23/62* (2023.01); *G02B 2027/014* (2013.01)

(58) Field of Classification Search
CPC .............. G02B 21/365; G02B 21/0032; G06F 3/04845; H04N 5/23216
See application file for complete search history.

(56) References Cited

U.S. PATENT DOCUMENTS

| | | | | |
|---|---|---|---|---|
| 3,994,558 A | * | 11/1976 | Schulz .............. | G02B 21/22 359/813 |
| 5,016,173 A | * | 5/1991 | Kenet ............... | A61B 5/0064 382/128 |
| 5,351,152 A | * | 9/1994 | Kuo ................. | G02B 21/0044 359/638 |
| 5,729,382 A | * | 3/1998 | Morita ............. | G02B 27/0081 359/376 |
| 5,825,915 A | * | 10/1998 | Michimoto ........ | G06T 7/593 382/281 |
| 6,020,993 A | * | 2/2000 | Greenberg ....... | G02B 21/361 359/464 |
| 6,099,522 A | * | 8/2000 | Knopp ............. | A61F 9/00804 606/5 |

(Continued)

OTHER PUBLICATIONS

MU Camera Series User's Manual (Windows), AmScope.com, 2017.

*Primary Examiner* — Frank F Huang
(74) *Attorney, Agent, or Firm* — Andrus Intellectual Property Law, LLP

(57) ABSTRACT

A digital microscopy system includes a microscope with optics. The digital microscopy system also includes a digital camera operatively secured to the microscope such that the digital camera operates to acquire digital photographs through the optics of the microscope. A controller is communicatively connected to the digital camera, such that the computer receives the acquired digital photographs from the digital camera. The controller further executes computer-readable code upon which the computer operates a graphical display to present a graphical user interface (GUI) configured to present at least one of the acquired digital photographs and at least one stored sample image.

8 Claims, 5 Drawing Sheets

(56) References Cited

U.S. PATENT DOCUMENTS

| | | | | |
|---|---|---|---|---|
| 6,101,265 A * | 8/2000 | Bacus | G06T 3/4038 | 382/128 |
| 6,215,898 B1 * | 4/2001 | Woodfill | G06T 7/593 | 348/E13.016 |
| 6,320,696 B1 * | 11/2001 | Greenberg | G02B 21/22 | 359/377 |
| 6,344,039 B1 * | 2/2002 | Tang | A61F 9/008 | 606/4 |
| 6,606,406 B1 * | 8/2003 | Zhang | G06T 7/593 | 345/422 |
| 6,763,125 B2 * | 7/2004 | Ohta | G06V 20/588 | 382/104 |
| 6,839,166 B2 | 1/2005 | Fukushima et al. | | |
| 6,996,341 B2 * | 2/2006 | Hanzawa | G03B 35/10 | 396/432 |
| 7,046,822 B1 * | 5/2006 | Knoeppel | G06V 20/58 | 348/E13.028 |
| 7,139,424 B2 * | 11/2006 | Sogawa | H04N 13/239 | 348/E13.016 |
| 7,369,306 B2 * | 5/2008 | Straehle | G02B 17/045 | 359/372 |
| 7,394,979 B2 | 7/2008 | Luther et al. | | |
| 7,453,631 B2 * | 11/2008 | Namii | H04N 13/239 | 359/377 |
| 7,625,088 B2 * | 12/2009 | Fujita | G06T 7/85 | 351/240 |
| 7,720,277 B2 * | 5/2010 | Hattori | G06T 7/593 | 382/104 |
| 7,756,357 B2 * | 7/2010 | Yoneyama | G06V 20/69 | 382/280 |
| 7,768,701 B2 * | 8/2010 | Namii | A61B 90/36 | 359/377 |
| 7,784,946 B2 * | 8/2010 | LeBlanc | A61B 3/132 | 351/221 |
| 7,821,705 B2 * | 10/2010 | Hayashi | G02B 21/361 | 359/380 |
| 7,830,445 B2 * | 11/2010 | Kawahara | G03B 13/36 | 396/125 |
| 7,897,942 B1 * | 3/2011 | Bareket | G03B 27/62 | 250/398 |
| 7,932,504 B2 * | 4/2011 | Yamada | G02B 21/16 | 250/461.2 |
| 8,199,147 B2 * | 6/2012 | Ishiyama | H04N 13/254 | 345/635 |
| 8,233,031 B2 * | 7/2012 | Saito | G06T 7/593 | 382/168 |
| 8,508,646 B2 * | 8/2013 | Katerberg | H04N 5/23232 | 359/437 |
| 8,582,849 B2 * | 11/2013 | Eichhorn | G16H 80/00 | 382/128 |
| 9,829,696 B2 * | 11/2017 | Shen | G02B 21/365 | |
| 9,971,138 B2 | 5/2018 | Griffin et al. | | |
| 2003/0112509 A1 * | 6/2003 | Takahashi | H04N 13/218 | 359/462 |
| 2004/0070822 A1 * | 4/2004 | Shioda | A61B 90/36 | 359/372 |
| 2004/0136567 A1 * | 7/2004 | Billinghurst | G06T 7/248 | 382/103 |
| 2006/0004292 A1 * | 1/2006 | Beylin | A61B 5/0071 | 600/476 |
| 2007/0121202 A1 * | 5/2007 | Riederer | G02B 21/22 | 359/377 |
| 2008/0002878 A1 * | 1/2008 | Meiyappan | G06T 7/32 | 382/294 |
| 2009/0275929 A1 * | 11/2009 | Zickler | A61F 9/00804 | 606/4 |
| 2010/0141802 A1 * | 6/2010 | Knight | G02B 7/282 | 348/340 |
| 2011/0080536 A1 * | 4/2011 | Nakamura | G03B 35/20 | 349/15 |
| 2011/0157350 A1 * | 6/2011 | Yamamoto | G02B 21/14 | 382/106 |
| 2014/0068442 A1 | 3/2014 | Eichhorn et al. | | |
| 2020/0211698 A1 * | 7/2020 | Douglas | G09B 23/286 | |
| 2020/0310097 A1 * | 10/2020 | Zheng | G02B 21/36 | |

* cited by examiner ial Patent Application No. 63/056,283, filed on Jul. 24, 2020, the entirety of which is incorporated by reference.

DIGITAL MICROSCOPY SYSTEM AND GRAPHICAL USER INTERFACE

CROSS-REFERENCE TO RELATED APPLICATIONS

The present application claims priority of U.S. Provisional Patent Application No. 63/056,283, filed on Jul. 24, 2020, the entirety of which is incorporated by reference.

BACKGROUND

The present disclosure relates to the field of microscopy. More specifically, the present disclosure relates to a computer graphical user interface (GUI) and a microscope-GUI system to facilitate use of scientific microscopy equipment by children and young adults.

Microscopes are useful tools for the investigation of objects too small for the eye to see. Microscopes find utility in scientific investigation as well as manufacturing and material investigation. Microscopes are also useful tools in science education.

Digital microscopy further integrates the optics of a microscope with one or more digital cameras to capture a digital image through the microscope lens. Microscope technology is available that leverages the tools of digital microscopy for collaborative examination, for example as disclosed in U.S. Pat. No. 9,829,696, entitled "Adjustable Digital Microscope Display"; U.S. Pat. No. 8,582,849, entitled "Viewing Digital Slides"; and U.S. Pat. No. 6,839,166, entitled "Versatile Microscope System with Modulating Optical System," which are incorporated by reference herein in their entireties. However, additional tools are needed to facilitate digital microscopy use and education by children and young adults.

BRIEF DISCLOSURE

The present disclosure relates to the field of microscopy. More specifically, the present disclosure relates to a computer graphical user interface (GUI) and a microscope-GUI system to facilitate the use of scientific microscopy equipment by children and young adults.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by including instructions that, when executed by the data processing apparatus, cause the apparatus to perform the actions.

An example of a digital microscopy system includes a microscope with optics. The digital microscopy system also includes a digital camera operatively secured to the microscope such that the digital camera operates to acquire digital photographs through the optics of the microscope. A controller is communicatively connected to the digital camera, such that the computer receives the acquired digital photographs from the digital camera. The controller further executes computer-readable code upon which the computer operates a graphical display to present a graphical user interface (GUI) configured to present at least one of the acquired digital photographs and at least one stored sample image.

Implementations may include one or more of the following features. The controller operates the graphical display to present the GUI in which the GUI elicits an input from a user, and upon receipt of the input from the user the controller operates the digital camera to acquire at least one of the digital photographs. The GUI elicits an input from the user of an input to compare a current image from the digital camera to a saved microscopy image. The saved microscopy image is a user-generated image or a sample image. The GUI further may include at least one visual presentation of an interactive educational diagram of a microscope, whereupon the receipt of an input selection of at least one portion of the interactive educational diagram of the microscope, the GUI presents information about the selected portion. The microscope further may include a filter, the filter may be physically manipulable to control the light that reaches the optics. The filter changes at least one of a color, an intensity, or a shape of the light from an illuminator. The GUI presents a plurality of camera setting controls, the plurality of camera setting controls elicit user inputs that adjust the acquired digital photographs. The plurality of camera setting controls include hue, saturation, brightness, and contrast.

Another example of a digital microscopy system also includes a microscope. The microscope includes a stage, optics, and an ocular port. A digital camera is operatively received within the ocular port. The digital camera is configured to acquire a digital photograph through the optics of the microscope. A non-transient computer-readable medium is configured to store a plurality of saved microscopy images. A graphical display is configured to present a graphical user interface (GUI). A controller is communicatively connected to the digital camera. The controller operates to receive the digital photograph from the digital camera. The controller executes computer-readable code upon which the controller operates the graphical display to present the digital photograph from the digital camera within the GUI. The controller is further operable to simultaneously present a saved microscopy image from the plurality of saved microscopy images within the GUI with the digital photograph.

Implementations may include one or more of the following features. The digital photograph may be a digital video presented in real-time or near real-time from acquisition by the digital camera. The microscope further may include an illuminator positioned below the stage and a filter positioned between the illuminator and the optics. The filter changes at least one of a color, an intensity, or a shape of the light from the illuminator. The filter is a physically manipulable filter that enables selection between a plurality of selectable filter apertures. The controller is further operable to elicit at least one input of a camera setting adjustment, and upon the receipt of the at least one input of the camera setting adjustment. The controller operates to apply the camera setting adjustment to the digital photograph presented in the GUI. The controller is operable to save the digital photograph to the non-transient computer-readable medium as a saved digital photograph, where the plurality of saved microscopy images may include the saved digital photograph. The saved microcopy images further may include preset sample microscopy images. The controller is operable to visually present the saved digital photograph in the GUI. The controller operates to visually present a plurality of image manipulation tools within the GUI, the plurality of image manipulation tools configured to elicit an input from a user to select a tool of the plurality of image manipulation tools. The controller is operable to receive user inputs of annotations to a saved digital photograph with a selected tool of the plurality of image manipulation tool, where the annotations are saved with the saved digital photograph as an annotated digital photograph, where the plurality of saved microscopy images may include the annotated digital photograph. Implementations of the described techniques may include hardware, a method or process, or computer software on a computer-accessible medium.

DETAILED DISCLOSURE

Figure 1:
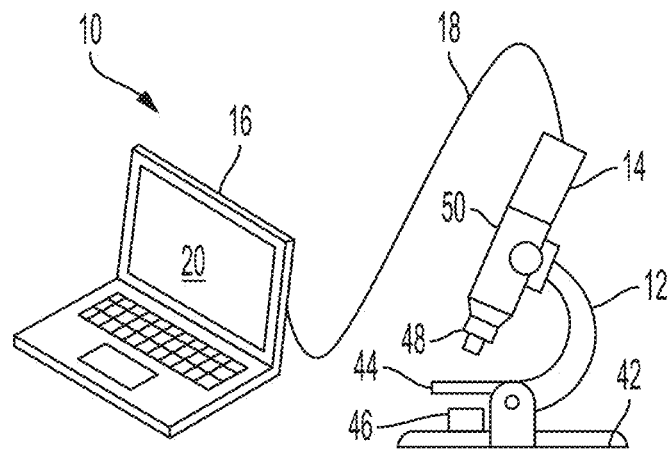
FIG. 1 is an example of a digital microscopy system.

FIG. 1 presents an example of a digital microscopy system 10. The system 10 includes a microscope 12. The microscope 12 is outfitted with a digital camera 14. The digital camera 14 may be, for example, a digital eyepiece microscope camera or a camera connected to a microscope through an auxiliary port e.g. a (trinocular design), examples of which may be any of the MD series or MU series microscope cameras available from United Scope LLC. The digital camera 14 may exemplarily be a CMOS or CCD camera configured to capture digital images through the optics of the microscope 12. The digital camera 14 may include mounting hardware to secure to a variety of sizes of microscope ocular ports, particularly the ocular port 50 of the microscope 12. The microscope 12 includes a base 42 that supports the microscope 12. The slide or sample for viewing is positioned on the stage 44. An illuminator 46 projects light upwards through the stage and the sample to optics including an objective lens 48. As previously noted, the digital camera 14 serves as the eyepiece and is fitted within the ocular port 50.

The digital camera 14 is communicatively connected to a computer 16. The communicative connection may be provided with a combined data and power wire 18, but in other examples, may be a wireless communication connection between the digital camera 14 and the computer 16. It will be recognized that such wireless communication requires associated wireless (e.g. RF) transmission and reception hardware and software located at both the camera 14 and the computer 16. The computer 16 is exemplarily a laptop computer, but it will be recognized that the computer 16 may be a desktop, tablet, hand-held, or any other computer configuration. As will be described in further detail herein, the computer 16 includes a graphical display 20. The graphical display 20 operates to visually present a graphical user interface (GUI) that presents images captured by the digital camera in the manners as described in further detail herein.

Figure 2:
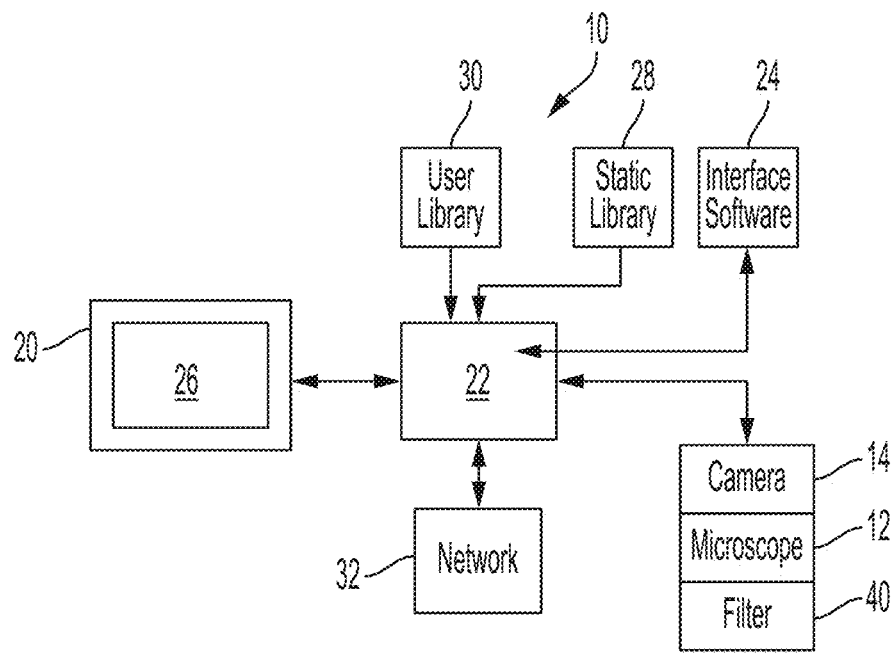
FIG. 2 is a schematic diagram of a digital microscopy system.

FIG. 2 is a schematic diagram of a digital microscopy system 10, which includes the example of the digital microscopy system 10 depicted in FIG. 1. It will be recognized that like reference numerals between the figures refer to like or similar components between the figures. The digital microscopy system includes the microscope 12 and digital camera 14 as described above. In examples, the microscope 12 further includes a filter 40 disposed between the sample and the illuminator. In an example, the filter 40 is located within the stage 44 (FIG. 1). The Filter 40 is mechanically operable to adjust a quality or qualities of the light from the illuminator that passes through the sample to the objective lens. The filter 40 is operable to change a quality of the light from the illuminator 46, including, but not limited to a color, an intensity, or a shape of the light from the illuminator 46 that passes from the filter 40 to the optics 48. In examples, the filter 40 may have different colors of filters which only permit particular wavelengths of visible light to pass through. In other examples, the filter 40 may be any of a variety of apertures which narrow, widen, intensity, diffuse, or impart another quality on the light from the illuminator 46.

The digital microscopy system 10 further depicts components of the computer 16 or connected to the computer 16. The computer 16 includes a controller 22. The controller 22 may be any of a variety of controllers, microcontrollers, processors, or integrated circuits as known in the art of digital image collection and/or analysis. In an example, the controller 22 is a single board computer (SBC) which includes a microprocessor in combination with circuitry and other electrical components (e.g. a data communication port, a wireless transmitter, a wireless receiver) used to carry out the functions as described herein. The controller 22 is communicatively connected to interface software 24. The interface software 24 is stored on a computer-readable medium which is a non-transitory computer-readable medium upon which computer-readable code embodying the interface software programs containing algorithm and/or software modules containing algorithms for the image processing and user interface processes described herein which upon execution by the controller 22 causes the controller 22 to carry out the calculations and functions as described in further detail herein.

The controller 22 executes the interface software 24 from the CRM to operate the graphical display 20 to visually present a GUI 26 thereon. The GUI 26 is operated in the manner described herein to actively engage a child or young adult in the viewing, capturing, analyzing, comparing, and sharing of digital microscopy images. FIGS. 3-6 provide exemplary screenshots as may be presented in the GUI 26, and which will be described in further detail herein.

The digital microscopy system 10 further includes a sample library 28 and a user library 30. The sample library 28 is exemplarily stored on a computer-readable medium that is communicatively connected to the controller 22. The sample library 28 includes stored microscopy images and other educational content or images as described herein. The stored microscopy images may be annotated or interactive images with pop-up or alt-text annotations that are presented upon a selection or cursor interaction through the GUI. The sample library 28 may be pre-populated with the stored images, while in other examples, the controller 22 includes a network connection 32 that connects the controller 22 to other sources of images for the sample library 28, for example through the internet.

The user library 30 is also exemplarily stored on a computer-readable medium that is communicatively connected to the controller 22. The user library 30, sample library 28, and/or the interface software 24 may be stored on the same computer-readable medium or may be stored on separate devices. The user library 30 stores the images captured by the user with the camera 14 as described herein. The user library 30 also stores images annotated or modified as described in further detail herein by the user. The annotated or modified images stored in the user library 30 may include user-modified versions of images originally retrieved from the sample library 28 or via the network connection 32.

In still further examples, annotated or modified images stored in the user library 30 may be accessible outside of the GUI environment provided upon execution of the interface software. That is, once an image is captured and stored or annotated or otherwise modified and stored, either at the user library 30 or at remotely located storage, for example, accessible through the network connection 32 and/or the internet, such image may be accessible apart from the GUI environment provided upon execution of the interface software. In such examples, the stored images are accessible for use with other applications and/or for download or transmission via another digital communication network.

Figure 3:
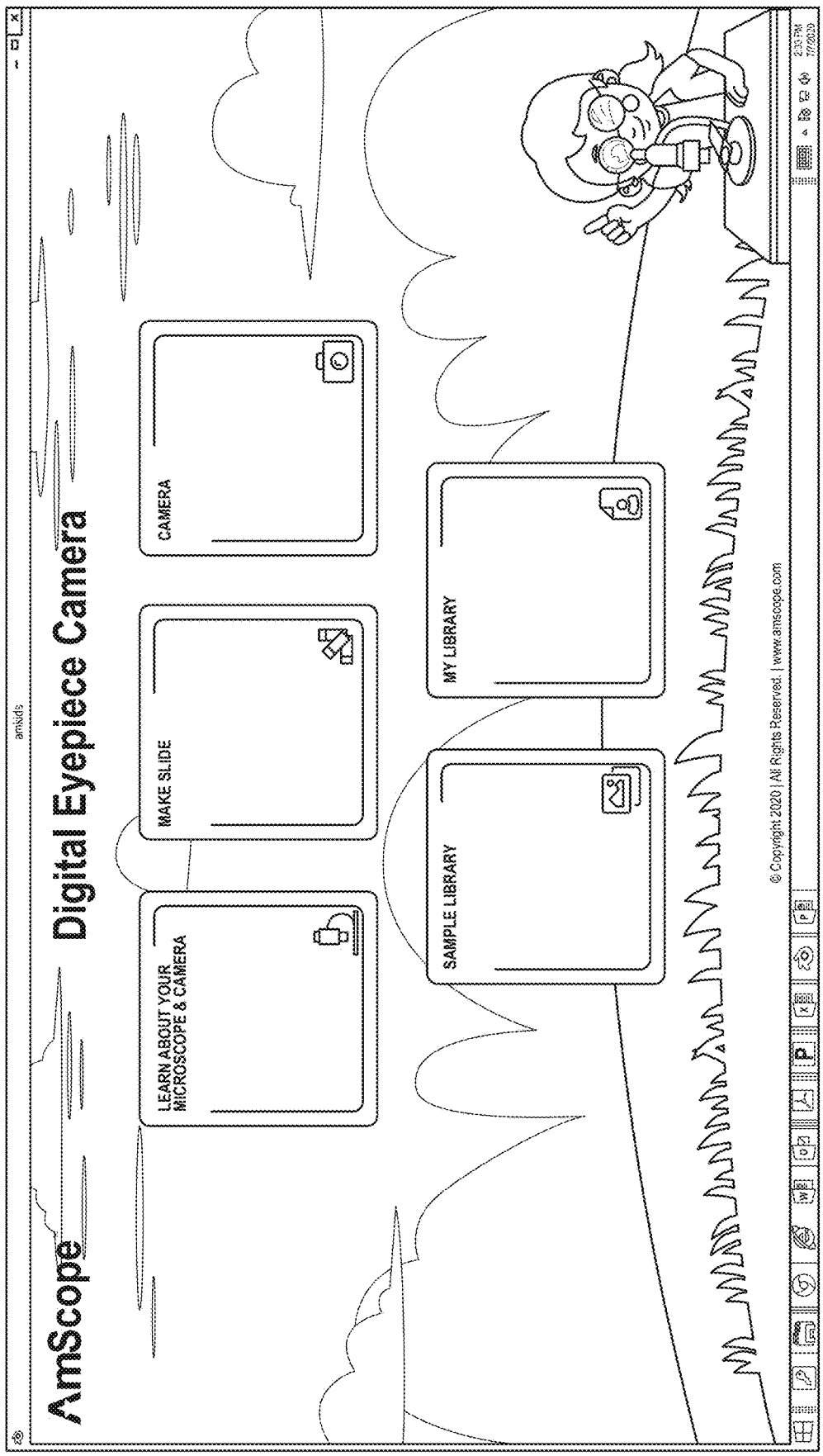
FIG. 3 is a screenshot of a graphical user interface (GUI) menu screen.
Figure 4:
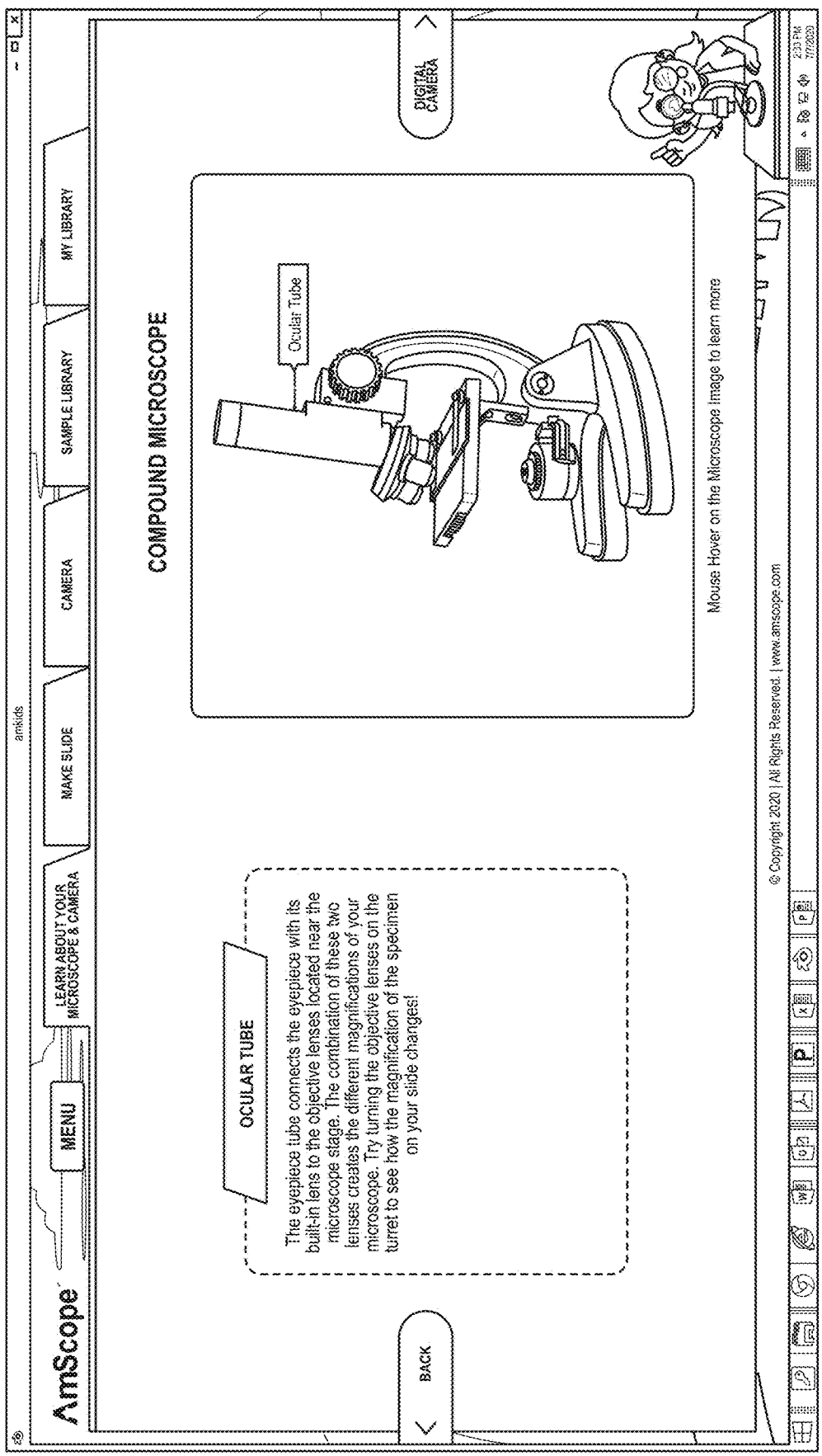
FIG. 4 is a screenshot of a GUI interactive information screen.

FIGS. 3-6 present examples of screenshots of the GUI 26 which represent navigation of the GUI 26 and use of the digital microscopy system 10. It will be recognized that the GUI 26 as shown in this example is merely exemplary and other implementations of the GUI 26 as described herein may be used while remaining within the scope of the present disclosure. FIG. 3 presents an example of a menu screen with the action buttons of "Learn About Your Microscope & Camera"; "Make Slide"; "Camera"; "Sample Library"; and "My Library", selection of any of these buttons opens functionalities of the GUI for further use and presentation Selecting the "Learn About Your Microscope & Camera" exemplarily causes a further menu to be presented from which a user can select to learn more about various kinds of microscopes. For example, the user is presented with a prompt to input a selection of a type of microscope. Upon making such a selection, for example by selecting a GUI button, causes the GUI to present a picture and educational information for the selected type of microscope. FIG. 4 presents an example of the GUI presentation after a user selection of "Compound Microscope." Selection of any portion of the microscope in the picture, for example by providing a touch-input, mouse-click, or hovering a cursor over such portion, provides further information specific to that portion. In FIG. 4 the user has selected the "Ocular Tube" of the depicted microscope, this component is highlighted, textually identified, and further information regarding the "Ocular Tube" is presented. It will be recognized that this operation is similarly provided for multiple microscope components and for multiple types of microscopes.

Returning to FIG. 3, upon a user selection of the "Make Slide" button, the processor operates to cause the presentation of a series of screens in the GUI with textual, visual, and/or audiovisual instructions and steps for users to prepare a dry slide, prepare a wet slide, and to stain a slide. In still further examples, the user may be presented with options to access GUI presented reference materials including a glossary and a microscope help section.

Similarly, upon a user selection of the "Sample Library" button, the processor operates to cause the presentation within the GUI of thumbnail image representations of a plurality of sample images that are stored in the computer-readable medium as described above. These sample images include images previously stored in the computer-readable medium or acquired via a computer network to which the controller is communicatively connected. The presentation of the thumbnail image representations prompts a user to submit a selection of one or more of these stored images. Receipt of a user selection of one or more stored images prompts the processor to open and present the stored image in the GUI in a manner as described in further detail herein for observation, investigation, and manipulation.

Likewise, upon a user selection of the "My Library" button, the processor operates to cause the presentation within the GUI of thumbnail image representations of a plurality of user-generated images that are stored in the computer-readable medium as described above. These stored images include images previously stored in the computer-readable medium by the user. The user-generated images may be still images or video images. The stored images may be digital images acquired through the digital camera or may be digital images acquired with the digital camera or sample images that have been manipulated by the user as described in more detail herein. The presentation of the thumbnail image representations prompts a user to submit a selection of one or more of these stored images. Receipt of a user selection of one or more stored images prompts the processor to open and present the stored image in the GUI in a manner as described in further detail herein for observation, investigation, and manipulation.

Figure 5:
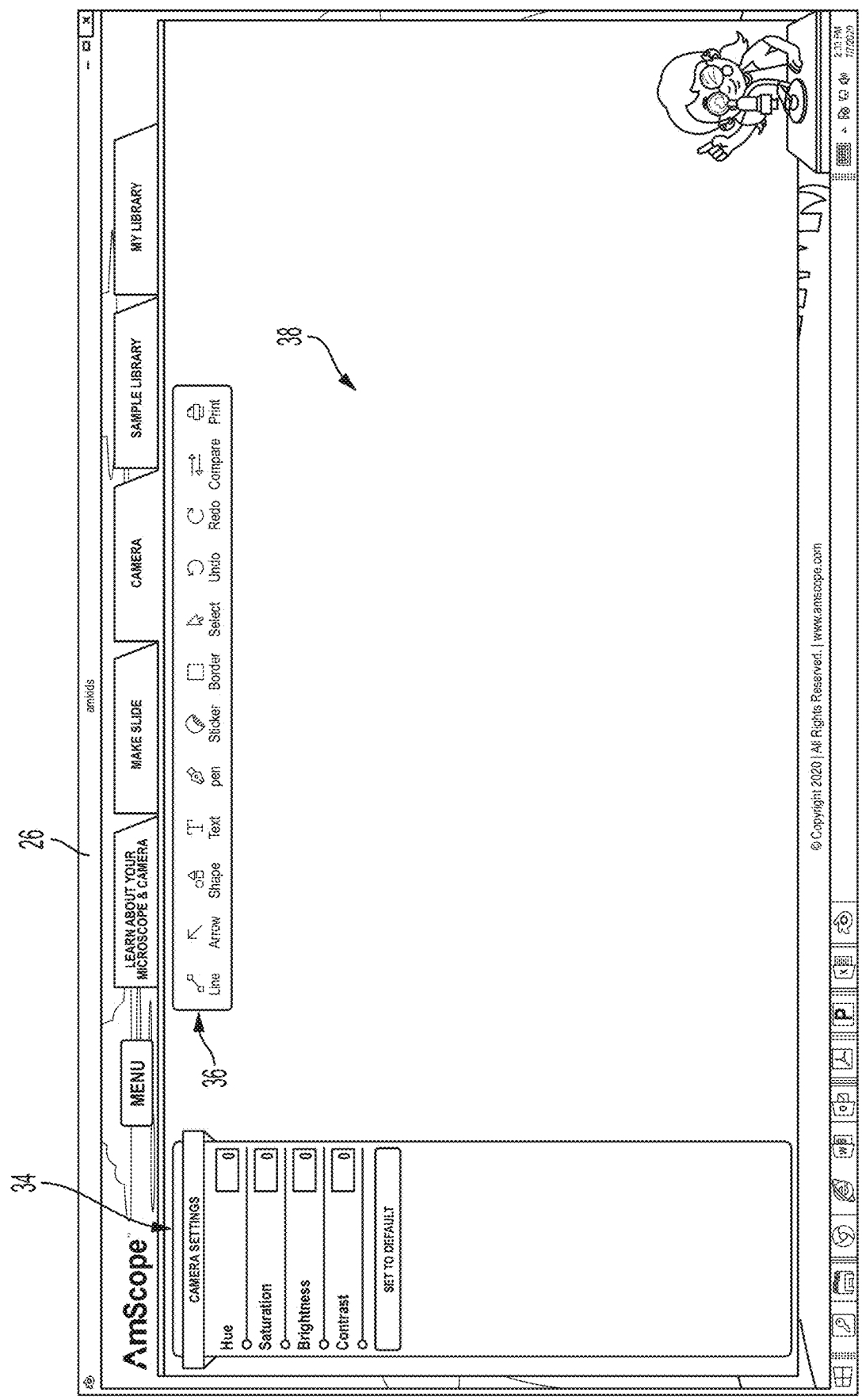
FIG. 5 is a screenshot of a GUI image presentation screen.
Figure 6:
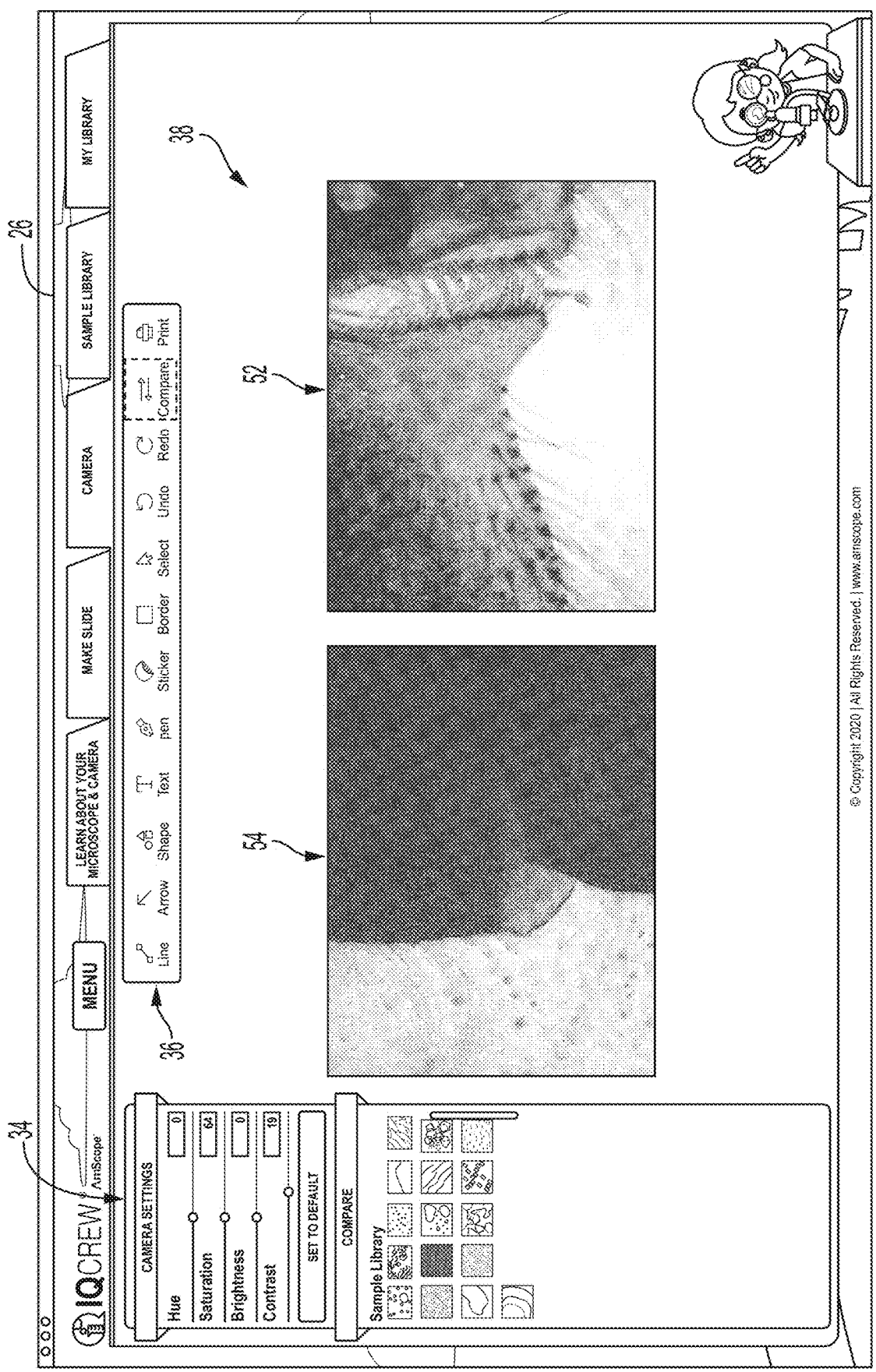
FIG. 6 is a screenshot of the image presentation screen depicting an example of the compare feature.

Upon a user selection of either the "Camera" button presented in FIG. 3, or of one of the aforementioned thumbnail images, the processor operates to present the image presentation screen, as depicted in FIGS. 5 and 6. Specifically, when the "Camera" button is selected, the processor operates to acquire images from the camera 14 through the microscope 12 and to present the acquired images in the image presentation screen 38. Selecting the "Camera" button causes the controller to operate the GUI to an image acquisition, investigation, and manipulation screen. Through this screen, the user can provide input controls to view a current image from the digital camera and to acquire such current image as a digital image, which may further be saved as a user-generated image. The acquired image may be a still image or a video image. It will be recognized that through this GUI, the user may also manipulate previously stored user-generated images or sample images as discussed above. Furthermore, the GUI presents a plurality of controls to manipulate the user-generated image to create still further user-generated images which may be saved and stored.

In an example, the camera 14 may receive video or real-time images from the camera and present the same in the image presentation screen. The processor further operates to provide within the GUI of the image presentation screen both image manipulation tools as well as camera setting controls. The GUI presents camera setting controls 34 including hue, saturation, brightness, and contrast; while it will be recognized that other camera settings may also be included while remaining within the scope of the present disclosure. User inputs of the camera settings through interaction with the GUI, for example by interaction with the visually presented slide bars, are received and processed by the controller 22, and applied to the images from the camera 14 presented within the GUI 26.

In examples, the user may operate both the filter 40 and the camera setting controls 34 to achieve an image of the sample for capture. As previously noted, the filter 40 may be a mechanically adjusted filter, for example, a filter comprising a plurality of filter lenses and/or apertures on a rotating disc movable by the user. The images from the camera 14 are adjustable by the user both with the filter 40 as well as the camera setting controls 34 presented in the GUI. Because the camera 14 provides real-time or near real-time feedback of the image, the GUI is operable to visually present to the user an image with the results of the filter and/or camera setting control adjustments as the adjustments are made.

The controller 22 further operates to visually present a plurality of image manipulation tools 36 within the GUI 26.

The image manipulation tools 36 prompt user inputs to select various annotation tools, for example, but not limited to, lines, arrows, shapes, text, pen, stickers, or borders. The image manipulation tools permit a user to create annotations on top of the visually presented image within the image presentation screen 38. These tools enable the user to draw various lines, arrows, shapes, text, pen lines, stickers, or borders to the image to further annotate or customize the image. Use of any or more than one of these manipulation tools can create new user-generated images which may be saved. In a further example, the user may use the image manipulation tools to create annotations over the top of the video image, prior to an acquisition of a user-generated image, and upon receipt of a user input, the processor operates to create a user-generated image that includes the annotations created by the user.

Upon a receipt of a user input, the processor operates to acquire an image with the camera and to store the image as a user-generated image as described above. The processor then operates to present the newly acquired user-generated image within the GUI. The image manipulation tools 36 are further available within the GUI for use with respect to a user-generated image or another form of saved image, including sample images. In still further examples, the image manipulation tools may include measurement tools for example rulers, relationship guides (e.g. representing particular angles or different radii), or point-to-point measurement. These examples of image manipulation tools are usable in relation to either the visually presented image from the camera or with any of the saved images, including user-generated images or sample images.

In a still further example, the GUI elicits an input from the user to "Compare" two or more images. With a selection of the "Compare" input, the GUI operates to present a split-screen between two or more images, the two or more images presented in the compare feature may include sample images and/or user-generated images. In a still further example, at least one of the images presented in the compare feature is a stored image, for example, a sample image or a user-generated image, while at least one of the other images presented in the compare feature is the current image output of the digital camera. In such an example, the user may be prompted to observe or manipulate the current image output of the digital camera in relation to observations or features of the presented stored image. The "Compare" feature of this application allows the user to compare the quality and presentation of images they have created to those created by professionals. This will help the user in learning how to properly mount, stain, and otherwise process specimens for best viewing results.

FIG. 6 provides an exemplary screenshot of the compare feature in use. When the "compare" feature is selected, the is prompted to select an image from the "Sample Library", or in another example, "My Library". This is, for example, a saved image 52 of a honey bee leg on the right of the image presentation screen 38. A second image 54 is presented on the left of the image presentation screen 38. The second image 54 is either a current image available from the camera or may be a previously acquired user-generated image stored in "My Library". Two or more sub-windows are created within the GUI to present a facilitated side-by-side comparison between two images from different image sources. Continuing with the example of the comparison of a "Sample Library" image to a camera image, a live video of the slide through the microscope as acquired by the camera is presented. The adjustment of slide position, focus, lighting, or filter on the microscope and the adjustment of the camera setting controls 34 within the GUI 26 permit manipulation of the second image 54 while maintaining a continued reference to the saved image 52. If the image is a live video image from the camera, the user may have the option to acquire a captured image to be stored in "My Library". In other examples, the image shown in the comparison may be a captured image, and the user may have the option to make adjustments to the microscope and/or slide and capture a new image for further comparison.

Through this comparison, the user can learn and investigate microscopy techniques of focus or lighting in direct comparison to a reference image. While the example provided in FIG. 6 is that of two images of a same content, in other examples, the comparison image may provide an example of a particular biological feature or slide construction technique, even though the subject of both slides may be different. For example, the comparison image and the camera image may both represent the same (or different) wet slide, dry slide, or slide staining techniques for comparison and investigation.

In still further examples, the software/system/GUI may be communicatively connected to an open or closed media sharing platform. This may exemplarily be a website or local network repository for a classroom or educational facility, or this may be a public or private social media account or group. This media sharing platform may include an online learning classroom platform for example, but not limited to, those as available under the names of GOOGLE CLASSROOM, MOODLE, or CANVAS. Once the system is communicatively connected to such a media sharing platform, the GUI may include a button or control within the GUI which may be selected by the user to share one or more of their share their own captured and/or modified images from the "My Library" storage.

Citations to a number of references are made herein. The cited references are incorporated by reference herein in their entireties. In the event that there is an inconsistency between a definition of a term in the specification as compared to a definition of the term in a cited reference, the term should be interpreted based on the definition in the specification.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

I claim:
1. A digital microscopy system comprising:
a microscope comprising optics;
a digital camera operatively secured to the microscope such that the digital camera operates to acquire digital photographs through the optics of the microscope; and a controller communicatively connected to the digital camera, such that the controller receives the acquired digital photographs from the digital camera, the controller further executes computer-readable code upon which the controller operates a graphical display to present a graphical user interface (GUI) configured to present at least one of the acquired digital photographs and at least one stored sample image;

wherein GUI further comprises at least one visual presentation of an interactive educational diagram of a microscope, wherein upon the receipt of an input selection of at least one portion of the interactive educational diagram of the microscope, the controller operates the GUI to present information about the selected portion.

2. The digital microscopy system of claim 1, wherein the controller operates the graphical display to present the GUI in which the GUI elicits an input from a user, and upon receipt of the input from the user the controller operates the digital camera to acquire at least one of the digital photographs.

3. The digital microscopy system of claim 2, wherein the GUI elicits an input from the user of an input to compare a current image from the digital camera to a saved microscopy image and the GUI is configured to simultaneously present a selected saved microscopy image and the current image from the digital camera.

4. The digital microscopy system of claim 3, wherein the saved microscopy image is a user-generated image or a sample image.

5. The digital microscopy system of claim 1, wherein the microscope further comprises a filter, the filter physically manipulable to control light that reaches the optics.

6. The digital microscopy system of claim 5, wherein the microscope further comprises an illuminator configured to project light towards the optics, and wherein the filter is positioned between the illuminator and the optics and changes at least one of a color, intensity, or shape of the light from the illuminator.

7. The digital microscopy system of claim 1, wherein the GUI presents a plurality of camera setting controls, the plurality of camera setting controls elicit user inputs, and the controller is configured to adjust the acquired digital photographs in response to receipt of at least one user input.

8. The digital microscopy system of claim 6, wherein the plurality of camera setting controls include hue, saturation, brightness, and contrast.

* * * * *